US006528126B1

(12) United States Patent
Feyrer et al.

(10) Patent No.: US 6,528,126 B1
(45) Date of Patent: Mar. 4, 2003

(54) METHOD FOR MULTI-LAYER VARNISHING WITH RADIATION HARDENABLE COATING AGENTS

(75) Inventors: Wolfgang Feyrer, Köln (DE); Christine Kimpel, Schwelm (DE); Helmut Löffler, Brühl (DE); Karin Maag, Inzlingen (DE); Jens Zeyen, Wuppertal (DE)

(73) Assignee: E. I. du Pont de Nemours and Company, Wilmington, DE (US)

( * ) Notice: Subject to any disclaimer, the term of this patent is extended or adjusted under 35 U.S.C. 154(b) by 0 days.

(21) Appl. No.: 09/622,389

(22) PCT Filed: Nov. 24, 1999

(86) PCT No.: PCT/EP99/09062

§ 371 (c)(1),
(2), (4) Date: Oct. 2, 2000

(87) PCT Pub. No.: WO00/35597

PCT Pub. Date: Jun. 22, 2000

(30) Foreign Application Priority Data

Dec. 16, 1998 (DE) ........................................ 198 57 940

(51) Int. Cl.[7] ............................ C08F 2/48; C08F 2/46; C08J 7/04; C08J 7/18

(52) U.S. Cl. ....................... 427/493; 427/492; 427/508; 427/514; 427/521

(58) Field of Search ................................ 427/514, 512, 427/508, 492, 493, 521

(56) References Cited

U.S. PATENT DOCUMENTS 4,485,123 A * 11/1984 Troue ......................... 427/492
4,539,220 A * 9/1985 Martinelli
4,751,170 A * 6/1988 Mimura ...................... 427/502
5,486,384 A * 1/1996 Bastian et al. ............. 427/493
5,877,228 A * 3/1999 Mine et al. ................ 427/508
6,165,696 A * 12/2000 Fischer ....................... 427/514
6,180,325 B1 * 1/2001 Gelbart ....................... 427/521
6,200,646 B1 * 3/2001 Neckers et al. ............ 427/512
6,333,077 B1 * 12/2001 Maag et al. ............... 427/508
6,384,099 B1 * 5/2002 Ostler et al. ............... 427/493

FOREIGN PATENT DOCUMENTS

DE 4421558 A1 12/1995
DE 19533858 A1 7/1997
WO WO 00/35598 6/2000

* cited by examiner

*Primary Examiner*—Marianne Padgett
(74) *Attorney, Agent, or Firm*—Steven C. Benjamin

(57) ABSTRACT

A process for multi-coat lacquering by applying a coat of filler and/or other coating compounds on to a substrate and then a top coat consisting of a base coat/clear lacquer construction or of a pigmented one-coat finish, at least one of the coats in the multi-coat construction being prepared from a coating compound which is at least partially curable by high-energy radiation, and irradiating this (these) coat(s) with UV radiation and IR radiation, a UV source having a proportion of IR radiation in its emission spectrum being, used for the irradiation with UV and IR radiation and, by alternately adding a UV filter and an IR filter and/or alternately adding and removing a UV filter or an IR filter in front of the radiation source, at least two irradiation intervals being formed, during which irradiation is variously carried out with UV radiation, IR radiation or UV radiation and IR radiation simultaneously.

9 Claims, No Drawings

METHOD FOR MULTI-LAYER VARNISHING WITH RADIATION HARDENABLE COATING AGENTS

BACKGROUND OF THE INVENTION

The invention relates to a process for the multi-coat lacquering of substrates using radiation-curing coating compounds. The process can advantageously be applied in vehicle and industrial lacquering, preferably in vehicle refinishing lacquering.

In the wood coating industry in particular, UV technology has been the state of the art in coating and curing for some time. In other areas of application too, however, including vehicle lacquering, the use of coating compounds which can be cured by high-energy radiation has become known. The advantages of radiation-curing coating compounds, such as e.g. the very short cure times, the low solvent emission of the coating compounds and the very good hardness of the resulting coatings, are also exploited here.

In addition to suitable radiation-curing binders and photoinitiators, various types of radiation sources and possible processes for curing by means of high-energy radiation have also become known.

Thus, for example, in the UV coating of industrial goods in a continuous conveyor plant using radiation-curing binders or coating compounds, the UV radiation can be combined with a thermal treatment. This means that the actual curing process by means of UV radiation can, for example, be followed by a heating phase. The heating or thermal treatment can be applied, for example, by means of hot air, a hot plate or infrared radiation (IR radiation). The inventors of the present application have found, and described in the German patent application by the same applicants on the same date of application with the title "Verfahren zur Mehrschichtlackierung" [A process for multi-coat lacquering], that, for example, drying of the coating with IR radiation can take place before the UV irradiation and in this way various properties, such as e.g. inter-layer adhesion, weathering resistance and appearance, can be improved. Solvent evaporation times necessary after the application of the radiation-curing lacquer can also be reduced in this way. When using radiation-curing water-based lacquers in particular, a considerable shortening of the solvent evaporation phase is achieved in this way. Subsequent IR irradiation is advantageous when, for example, apart from the radiation-curing binders, other binders are contained in the lacquer which cross-link via an additional mechanism. In this case, complete curing can be achieved rapidly with subsequent IR irradiation.

A combination of UV and IR irradiation during the curing process in the broader sense can be achieved, for example, by continuously passing the UV source and IR source and/or the object to be irradiated in front of one another, or by discontinuously placing the UV source and IR source alternately in front of the object to be irradiated. Disadvantages of the processes described are that, on the one hand, in the continuous process, there have to be at least two zones for drying and curing (UV zone and IR zone) to be passed through and the UV and IR zones have to be separated from one another, e.g. by a glare shield, and that, on the other hand, in the discontinuous process, UV and IR sources have to be exchanged with one another in front of the object to be irradiated as a function of the number of irradiation intervals desired, the UV radiator generally not being operated during the IR drying phase. The latter discontinuous method, and the burn-in times necessary for each of the radiation sources, especially the UV radiators, generally have a delaying effect on the entire lacquering operation. Especially when the discontinuous method is used, e.g. in lacquering workshops, the vehicle throughput and thus, ultimately, the profitability of the workshop can be impaired in this way.

SUMMARY OF THE INVENTION

The object of the invention was therefore to provide a process for multi-coat lacquering using coating compounds that are at least partially radiation-curing, which enables UV irradiation and IR irradiation to be combined in a simple, economical and time-saving manner when curing radiation-curing coatings, without having to use an undesirably large amount of apparatus and therefore to operate cost-intensively.

The object is achieved by the process for multi-coat lacquering provided by the invention, by applying one or more fillers and/or other coats of coating compound on to an optionally pre-coated substrate and then a top coat consisting of a base coat/clear lacquer construction or of a pigmented one-coat finish, at least one of the coats in the multi-coat construction being prepared from a coating compound which is at least partially curable by high-energy radiation, and irradiating this (these) coat(s) with UV radiation and IR radiation, which is characterized in that a UV source having a proportion of IR radiation in its emission spectrum is used for the irradiation with UV and IR radiation and that, by alternately adding a UV filter and an IR filter and/or alternately adding and removing a UV filter or an IR filter in front of the UV source, at least two irradiation intervals are formed, during which irradiation is variously carried out with UV radiation, IR radiation or UV radiation and IR radiation simultaneously.

With the method according to the invention it is possible to use UV filters and IR filters alternately. It is also possible to work either with a UV filter or with an IR filter and to remove this alternately so that irradiation is performed with UV and IR radiation simultaneously. The two methods can be combined with one another so that irradiation intervals with UV radiation, IR radiation or UV and IR radiation together are formed alternately.

DETAILED DESCRIPTION OF THE INVENTION

The UV sources modified with an removable filter which can be used in the process according to the invention can thus be used quickly and easily as pure IR radiators.

Conventional UV sources can be used as a UV source in the process according to the invention, provided that they have a proportion of IR radiation in their emission spectrum. Such UV sources are known to the person skilled in the art and are generally accessible. The proportion of IR radiation necessary in the emission spectrum of the UV source is preferably a proportion of radiation in the short-wave range of IR radiation. This involves the wavelength range of about 700 to about 2500 nm. This range substantially corresponds to the emission spectra of conventional IR radiators that can be used in lacquer drying, which are in the range of 500 to 2500 mn, preferably 800 to 2000 nm. UV sources that can be used according to the invention thus have, for example, an emission spectrum, including the UV and IR emission proportions, in the range of 180 to 2500 nn, preferably 200 to 2500 nm, particularly preferably 200 to 2000 nm.

The UV sources common in practice and known to the person skilled in the art generally have a proportion of UV radiation in the emission spectrum of about 25%. In addition, there is a considerable proportion of IR radiation in the emission spectrum in each case. For example, the proportion of IR radiation can be up to about 60%.

Suitable UV sources for the process according to the invention are, for example, high-pressure, medium-pressure and low-pressure mercury vapor radiators. Of these, lamps with a lamp length of between 5 and 200 cm are common. Depending on the particular application and the radiation energy required, lamp and reflector geometry are coordinated in the conventional manner. The lamp output in each case can vary, for example between 20 and 250 W/cm (watts per cm lamp length). Lamps with outputs of between 80 and 120 W/cm are preferably used. The mercury vapor lamps can also optionally be doped by introducing metal halides. Examples of doped radiators are iron or gallium mercury vapor lamps.

Other examples of UV sources are gas-filled tubes, such as e.g. low-pressure xenon lamps. In addition to these continuously operating UV sources, however, discontinuous UV sources can also be used. These are preferably so-called high-energy flash devices (UV flashlights for short). The UV flashlights can contain a number of flash tubes, e.g. quartz tubes filled with inert gas such as xenon. The UV flashlights have a luminous intensity of, for example, at least 10 megalux, preferably of 10 to 80 megalux, per flash discharge. The energy per flash discharge can, for example, be 1 to 10 kilojoules.

The UV sources that can be used in the process according to the invention are modified by adding a UV or IR filter in front of the UV source. A UV filter means a filter which substantially does not transmit any radiation in the UV radiation wavelength range, i.e. especially in the range of about 180 to 380 nm, but is transparent to IR radiation. An IR filter means a filter which substantially does not transmit any radiation in the IR radiation wavelength range, especially in the range of about 700 to 2500 nm, but is transparent to UV radiation. The visible light wavelength proportion can, depending on the selection of the appropriate filter, be completely or partially filtered out or transmitted. In the process according to the invention, conventional UV and/or IR filters can be used to modify the UV source. They are known to the person skilled in the art and are commercially available. The filters can, for example, be films, e.g. IR transmitting films, or glass filters with different transmission curves. The filters are obtainable in different sizes, shapes and various thicknesses. In the process according to the invention, GG-type glass filters, e.g. GG 474 from Schott, for example, can be used as UV filters. So-called IR transmitting films can also be used. In the process according to the invention, FG-type glass filters, e.g. FG 3, or BG-type, e.g. BG 26, BG 3, from Schott, for example, can be used as IR filters.

From an apparatus point of view, the UV sources that can be used in the process according to the invention can be fitted with the appropriate filter in any manner. Thus, for example, it is possible to add the filter by means of suitable connecting elements or mountings in such a way that it can be folded away, detached or pushed across. It is also possible to position the filter in a device or mounting separate from the UV source directly in front of the UV source.

The UV sources are generally integrated into a UV unit which normally consists of the UV sources, the reflector system, the power supply, electrical controls, the shielding, the cooling system and the ozone extraction. Other arrangements are also possible, of course, and it is also possible to use only some of the components of a UV unit mentioned here.

The process for multi-coat lacquering according to the invention can be carried out in various ways using the UV sources described above which can be modified with a filter. Irradiation intervals with UV radiation, IR radiation or UV and IR radiation can be combined at will. Both the number and the order of each of the irradiation intervals can be varied, together with the irradiation period per irradiation interval and the total irradiation period.

The addition of an IR irradiation step prior to UV irradiation and of an IR irradiation step following UV irradiation will be explained in more detail here by way of an example.

The curing process with irradiation intervals of IR irradiation followed by UV irradiation will first be explained. In the first step, the coating compound which can be at least partially cured by high-energy radiation is applied. The application takes place by conventional means, e.g. by spray application. Application is followed, after an optional solvent evaporation phase, by a drying or heating phase with IR radiation. The drying phase is intended to accelerate the solvent evaporation, i.e. as a result of the action of heat, the evaporation of the organic solvents still present in the coating and/or, in the case of water-based lacquers, of the water, should occur within a relatively short time. In addition, the heating of the substrate surface achieved with the IR irradiation also has a positive effect on the curing process by means of UV radiation, since a higher crosslink density can be achieved in binder systems curable by UV radiation if the crosslinking is initiated in heat.

The IR irradiation is achieved in that, as already described above, a UV filter is added in front of the UV source used and irradiation is applied accordingly. In this irradiation interval, therefore, only a heating of the substrate surface occurs but no crosslinking by means of UV radiation. The irradiation period with IR radiation can last 1 to 20 min, for example. In the event of a UV flashlight being used as the UV source, the IR irradiation can also take place by triggering several flash discharges. The irradiation period depends, for example, on the type and quantity of solvents still present in the coating after application. As a function of the irradiation period and output of the radiation source, temperatures of e.g. 40 to 200° C. can be reached on the substrate surface. The settings should preferably be adjusted so that temperatures of e.g. 40 to 100° C. are reached on the substrate surface. When the desired substrate surface temperature is reached or the planned irradiation period has elapsed, the UV filter is removed. After removing the LJV filter, the LJV crosslinking begins instantly in the case of continuously operating radiation sources. In the case of UV flashlights to be operated discontinuously, the desired UV flashes are triggered after removing the UV filter.

When UV flashlights are used as the UV source, the irradiation period with UV radiation can be in the range of, for example, 1 millisecond to 400 seconds, preferably 4 to 160 seconds, depending on the number of flash discharges selected. The flashes can be triggered, for example, approximately every 4 seconds. Curing can take place e.g. by 1 to 40 consecutive flash discharges.

When continuous UV sources are used, the irradiation period can, for example, be in the range of a few seconds to about 5 minutes, preferably less than 5 minutes.

The distance between the UV sources and the substrate surface to be irradiated can, for example, be 5 to 60 cm. The shielding of the UV sources to avoid the leakage of radiation can be achieved e.g. by using an appropriately lined protective housing around a transportable lamp unit or with the aid of other safety measures known to the person skilled in the art.

One of the advantages offered by coupling an IR irradiation phase with a subsequent UV irradiation phase using the UV sources which can be used in the process according to the invention with an added UV filter is that the burn-in phase of a continuous UV source can be utilized for pre-drying or heating the substrate surface. If, in addition to the binders which are curable by UV radiation, other binders are contained in the coating compound which crosslink or cure by an additional mechanism, there is the further advantage that a certain initial crosslinking already takes place as a result of the IR irradiation, which leads, for example, to improved stability.

The curing process with irradiation intervals of UV irradiation followed by IR irradiation will be explained below. In the first step, the coating compound which is at least partially curable by high-energy radiation is applied. The application can take place by conventional means, e.g. by spraying. The application is followed by the irradiation phase with UV radiation. This UV irradiation is carried out in accordance with the statements made above. On completion of the UV irradiation phase, the irradiation phase with IR radiation follows. The IR irradiation is performed in that, as already described above, a UW filter is added in front of the UV source used and irradiation is applied accordingly. The subsequent IR irradiation phase can last, for example, 0.5 to 30 minutes. Otherwise, the statements already made above apply to the IR irradiation.

The coupling of a UV irradiation phase with a subsequent IR irradiation phase can be advantageous especially if, in addition to the radiation-curing binders, other binders are also contained in the coating compound applied which crosslink via an additional mechanism and/or are physically drying. In these cases, the final IR drying phase rapidly leads to the complete cure of the coating applied.

In addition to these two combinations of different irradiation intervals, which are explained only by way of examples, any other combinations of V, IR or UV and IR irradiation are, of course, possible. Other possible examples of combinations are: IR irradiation—UV irradiation—IR irradiation; UV irradiation—IR irradiation—TV irradiation—IR irradiation. Furthermore, it is also possible to use various irradiation intervals in conjunction with carrying out several spray operations or working operations, or in conjunction with the radiation curing of several consecutive coats of the multi-coat construction.

After applying the coating compound which is at least partially curable by high-energy radiation in a spray operation, for example, an IR irradiation and a subsequent UV irradiation can take place, and the coating compound is then applied in one or more further spray operations and again, first an IR and then a UV irradiation is carried out.

It is also possible first to apply a base coat which is at least partially radiation-curing in a multi-coat construction, and to subject it to first an IR and then a UV irradiation. A clear lacquer which is at least partially radiation-curing is then applied and again subjected to first an IR and then a UV irradiation. In both cases, a further IR irradiation can optionally follow. The radiation curing of the individual coats of the multi-coat construction and of the coats applied by several spray operations can take place with the same or a different radiation intensity and a different irradiation period for each coat individually or for two or more coats together in each case.

One or more coats of a conventional multi-coat construction in vehicle lacquering can be cured by the process according to the invention. This can be, for example, a multi-coat construction consisting of primer, filler, base coat, clear lacquer or of base coat, filler, one-coat finish. One or more coats of the multi-coat construction can be prepared from coating compounds which are at least partially radiation-curing.

The coating compounds which are at least partially curable by high-energy radiation used in the process according to the invention are not subject to any restriction; they can be aqueous, diluted with solvents or free from solvents and water. They can be coating compounds which are completely or only partially curable by high-energy radiation, preferably by UV radiation. Coating compounds which are curable by high-energy radiation are especially cationically and/or free-radically curing coating compounds known to the person skilled in the art. Free-radically curing coating compounds are preferred. When high-energy radiation acts on these coating compounds, radicals are formed in the coating compound which trigger crosslinking by free-radical polymerisation of olefinic double bonds.

The free-radically curing coating compounds that can preferably be used contain conventional prepolymers, such as polymers or oligomers which have free-radically polymerisable olefinic double bonds, especially in the form of (meth)acryloyl groups in the molecule.

The prepolymers can be present in combination with conventional reactive thinners, i.e. reactive liquid monomers.

Examples of prepolymers or oligomers are (meth)acrylic functional (meth)acrylic copolymers, epoxy resin (meth) acrylates, polyester (meth)acrylates, polyether (meth) acrylates, polyurethane (meth)acrylates, unsaturated polyesters, unsaturated polyurethanes or silicone (meth) acrylates with number average molecular weights (Mn) preferably in the range of 200 to 10000, particularly preferably of 500 to 3000 and with an average of 2 to 20, preferably 3 to 10, free-radically polymerisable, olefinic double bonds per molecule. (Meth)acrylic here means acrylic and/or methacrylic.

If reactive thinners are employed, they are used for example in quantities of 1 to 50 wt.%, preferably of 5 to 30 wt.%, based on the total weight of prepolymers and reactive thinners. These are defined, low molecular-weight compounds, which can be mono-, di- or polyunsaturated. Examples of these reactive thinners are: (meth)acrylic acid and the esters thereof, maleic acid and the semiesters thereof, vinyl acetate, vinyl ether, substituted vinyl ureas, ethylene and propylene glycol di(meth)acrylate, 1,3- and 1,4-butanediol di(meth)acrylate, vinyl (meth)acryl ate, allyl (meth)acrylate, glycerol tri-, di- and mono(meth)acrylate, triethylolpropane tri-, di- and mono(meth)acrylate, styrene, vinyltoluene, divinylbenzene, pentaerythritol tri- and tetra (meth)acrylate, di- and tnipropylene glycol di(meth) acrylate, hexanediol di(meth)acrylate. The reactive thinners can be used individually or in a mixture. Diacrylates, such as e.g. dipropylene glycol diacrylate, tripropylene glycol diacrylate and/or hexanediol diacrylate are preferably used as reactive thinners.

The free-radical curing coating compounds contain photoinitiators, e.g. in quantities of 0.1 to 5 wt. %, preferably of 0.5 to 3 wt. %, based on the sum of free-radically polymerisable prepolymers, reactive thinners and photoinitiators. The conventional photoinitiators, such as e.g. benzoin and derivatives, acetophenone and derivatives, e.g. 2,2-diacetoxyacetophenone, benzophenone and derivatives, thioxanthone and derivatives, anthraquinone, I -benzoylcyclohexanol, organophosphorus compounds, such as e.g. acyl phosphine oxides, are suitable. The photoinitiators can be used alone or in combination. In addition, other synergistic components, e.g. tertiary amines, can be used.

The coating compounds which are at least partially curable by high-energy radiation that can be used in the process according to the invention can contain one or more other binders in addition to the binder system which is curable by means of high-energy radiation. The other binders that are optionally also present can be, for example, conventional binder systems which are curable by addition and/or condensation reactions and/or conventional physically drying binder systems. It is also possible that the binder system which is, per se, curable by high-energy radiation, has groups capable of crosslinking by addition and/or condensation reactions in addition to the free-radically polymerisable double bonds.

The addition and/or condensation reactions in the sense mentioned above are paint chemistry crosslinking reactions known to the person skilled in the art, such as for example the ring-opening addition of an epoxy group to a carboxyl group to form an ester group and a hydroxyl group, the addition of a hydroxyl group to an isocyanate group to form a urethane group, the reaction of a hydroxyl group with a blocked isocyanate group to form a urethane group with removal of the blocking agent, the reaction of a hydroxyl group with an N-methylol group with removal of water, the reaction of a hydroxyl group with an N-methylol ether group with removal of the etherifying alcohol, the transesterification reaction of a hydroxyl group with an ester group with removal of the esterifying alcohol, the transurethanising reaction of a hydroxyl group with a carbamate group with the removal of alcohol, the reaction of a carbamate group with an N-methylol ether group with the removal of the etherifying alcohol. Functional groups which allow crosslinking at low temperatures, e.g. at 20 to 80° C., are preferably contained. These can particularly preferably be hydroxyl and isocyanate groups.

The coating compounds which are at least partially curable by high-energy radiation that can be used in the process according to the invention can contain additional components conventional in lacquer formulation. They can, for example, contain conventional lacquer additives. These additives are the additives conventionally used in the lacquer sector. Examples of these additives are flow control agents, anti-cratering agents, antifoams, catalysts, adhesion promoters, additives which influence flow, thickeners, light stabilisers and emulsifiers. The additives are used in conventional quantities with which the person skilled in the art is familiar.

The coating compounds that can be used in the process according to the invention can contain small quantities of organic solvents and/or water. The solvents are conventional lacquer solvents. These can originate from the production of the binders or are added separately. Examples of these solvents are mono- or polyhydric alcohols, e.g. propanol, butanol, hexanol; glycol ethers or esters, e.g. diethylene glycol dialkyl ether, dipropylene glycol dialkyl ether, each with C1 to C6 alkyl, ethoxypropanol, butyl glycol; glycols, e.g. ethylene glycol, propylene glycol and oligomers thereof, esters such as e.g. butyl acetate and amyl acetate, N-methylpyrrolidone and ketones, e.g. methyl ethyl ketone, acetone, cyclohexanone; aromatic or aliphatic hydrocarbons, e.g. toluene, xylene or linear or branched aliphatic C6–C12 hydrocarbons.

The coating compounds that can be used in the process according to the invention can contain pigments and/or fillers. These are the conventional fillers used in the lacquer industry and organic or inorganic colouring and/or special effect pigments and anticorrosive pigments. Examples of inorganic or organic colouring pigments are titanium dioxide, micronised titanium dioxide, iron oxide pigments, carbon black, azo pigments, phthalocyanine pigments, quinacridone and pyrrolopyrrole pigments. Examples of special effect pigments are: metallic pigments, e.g. of aluminium, copper or other metals; interference pigments, such as e.g. metal oxide-coated metallic pigments, e.g. titanium dioxide-coated or mixed oxide-coated aluminium, coated mica, such as e.g. titanium dioxide-coated mica and graphite special effect pigments. Example of fillers are silicon dioxide, aluminium silicate, barium sulfate and talcum.

The general composition of the coating compounds that can be used, e.g. the type of pigmentation, depends on which coat of the multi-coat construction is to be prepared with the coating compounds.

The advantages of a combined UV/IR curing can be exploited with the process according to the invention, simply and without the use of a large amount of apparatus or high costs. Several alternate irradiation intervals with IR or UV radiation can follow one another, rapidly and without prolonged delays. It is not necessary to position several radiation sources, which would be ineffective, especially for the repair of minor damage. Overall, the process according to the invention makes it possible to work more economically, for example for touching up, especially in a lacquering workshop.

The invention will be explained in more detail by means of the following example.

EXAMPLE

A clear lacquer curable by UV radiation was first produced. For this purpose, the following components were mixed together and homogenized for a few minutes using a high-speed stirrer:

55 g Jagalux 5154 (OH- and acrylic functional binder)

10 g of a commercial polyisocyanate (Desmodur N 75)

3.8 g of a commercial photoinitiator based on aryl phosphine oxide (Lucirin TPO)

0.5 g of a commercial flow control agent (Byketol OK)

2.5 g butyl acetate

Preparation of a Multi-Coat construction

A water-based lacquer (produced in accordance with DE-A-196 43 802, production example 4) was applied to a filler-coated cataphoretic metal sheet in a resulting dry film thickness of about 15 $\mu$m. An IR irradiation then took place. A UV flashlight (output 3500 W, approx. 50% IR radiation proportion in the emission spectrum) provided with a detachable UV filter (GG 475 glass filter from Schott, size: 50×50 $mm^2$, thickness: 2 mm) was used for the irradiation. The irradiation took place with 30 flashes, triggered at intervals of about 4 s, at a distance from the object of about 20 cm.

The clear lacquer curable by UV radiation, produced as described above, was then applied in a resulting dry film thickness of about 50 $\mu$m.

After a solvent evaporation phase of 5 minutes at room temperature, IR irradiation of the applied clear lacquer took place. For this purpose, the UV flashlight modified with the UV filter mentioned above was used. The irradiation took place with 20 flashes triggered at intervals of approx. 4 s, at a distance from the object of about 20 cm. The UV irradiation then took place. For this purpose, the UV filter was removed from the UV flashlight and an IR filter (FG 3 glass filter from Schott, size: 50×50 $mm^2$, thickness: 2 mm) was attached. The irradiation took place with 20 flashes triggered at intervals of approx. 4 s, at a distance from the object of about 20 cm.

What is claimed is:

1. A process for applying a multi-coat lacquer finish on an optionally pre-coated substrate which comprises the following steps:

1) applying at least one coat to the substrate of a coating composition selected from the group consisting of a primer coating composition, a filler coating composition and another coating composition compound other than a primer coating composition and a filler coating composition, 2) applying a top coat lacquer finish selected from the group consisting of a base coat lacquer/clear lacquer coat finish and a pigmented one coat lacquer finish, 3) irradiating at least one of the applied coats of steps 1) and 2) with a radiation source comprising UV and IR radiation and wherein the radiation is being applied alternately by initially inserting a UV filter and subsequently an IR filter between the radiation source and the at least one of the applied coats thereby alternately exposing said coats to intervals of IR and UV radiation; and wherein at least one of the applied coats in the multi-coat lacquer finish comprises a composition that is at least partially curable by the radiation, and is at least partially cured by the irradiating step.

2. The process according to claim 1 wherein the following alternating exposure steps are used:

1) using the UV filter between the radiation source and the at least one of the applied coats thereby exposing the said coats to the interval of IR radiation;

2) removing the UV filter thereby exposing said coats to an interval of a simultaneous combination of IR and UV radiation;

3) using a IR filter between the source and the at least one of the applied coats thereby exposing said coats to the interval of UV radiation;

4) removing the IR filter thereby exposing the at least one of the applied coats to another interval of the simultaneous combination of IR and UV radiation.

3. A process for applying a multi-coat lacquer finish on an optionally pre-coated substrate which comprises the following steps:

1) applying at least one coat to the substrate of a coating composition selected from the group consisting of a primer coating composition, a filler coating composition and another coating composition compound other than a primer coating composition and a filler coating composition, 2) applying a top coat lacquer finish selected from the group consisting of a base coat lacquer/clear lacquer coat finish and a pigmented one coat lacquer finish, 3) irradiating at least one of the applied coats of steps 1) and 2) with a radiation source comprising UV and IR radiation and wherein the radiation is being applied alternately by initially inserting a UV filter thereby exposing the at least one of the applied coats to an interval of IR radiation and subsequently removing the UV filter thereby exposing the at least one of the applied coats to an interval of a simultaneous combination of IR and UV radiation; and wherein at least one of the coats in the multi-coat lacquer finish comprises a composition that is at least partially curable by the radiation and is at least partially cured by the irradiating step.

4. The process according to claim 3 wherein the following alternating exposure steps are used:

1) using the UV filter between the source and the at least one of the applied coats thereby exposing said coats to the interval of IR radiation;

2) removing the UV filter thereby exposing said coats to the interval of the simultaneous combination of IR and UV radiation; and 3) using the UV filter between the radiation source and the at least one of the applied coats thereby exposing said coats to another interval of IR radiation.

5. The process according to claims 1, 2, 3 or 4 in which the radiation source is a UV source having a proportion of the IR radiation in a wavelength range of 700 to 2500 nm in its emission spectrum.

6. The process according to claims 1, 2, 3, or 4 wherein the interval of IR radiation is in the range of 0.5 to 30 minutes.

7. The process according to claims 2, 3, or 4 wherein the interval of IR and UV radiation is in the range of 1 millisecond to 5 minutes.

8. The process according to claims 1, 2, 3, or 4 wherein the source of the UV radiation is a UV flashing light.

9. The process according to claim 8, wherein the UV flashing light has a luminous intensity of at least 10 megalux per flash discharge.

* * * * *